US008472600B2

(12) United States Patent
Chen et al.

(10) Patent No.: US 8,472,600 B2
(45) Date of Patent: Jun. 25, 2013

(54) SYSTEM AND METHOD FOR PROVIDING SIGNALING IN A NETWORK ENVIRONMENT

(75) Inventors: Henry Chen, Plano, TX (US); Paul H. Kyzivat, Hudson, MA (US); Sanjay K. Sinha, Karnataka (IN)

(73) Assignee: Cisco Technology, Inc., San Jose, CA (US)

( * ) Notice: Subject to any disclaimer, the term of this patent is extended or adjusted under 35 U.S.C. 154(b) by 750 days.

(21) Appl. No.: 12/614,214

(22) Filed: Nov. 6, 2009

(65) Prior Publication Data
US 2011/0110512 A1 May 12, 2011

(51) Int. Cl.
*H04M 1/00* (2006.01)
*H04M 3/00* (2006.01)
*H04M 3/42* (2006.01)
*H04L 12/66* (2006.01)

(52) U.S. Cl.
USPC ............... 379/201.12; 379/201.01; 379/350; 379/355.07; 379/355.08; 379/355.09; 370/352

(58) Field of Classification Search
USPC ............ 379/201.12, 201.01, 201.02, 201.05, 379/350, 355.07, 355.08, 355.09, 355.04, 379/355.1; 370/352
See application file for complete search history.

(56) References Cited

U.S. PATENT DOCUMENTS

| | | | | |
|---|---|---|---|---|
| 7,280,532 | B2 * | 10/2007 | Um | 370/352 |
| 2003/0007483 | A1 * | 1/2003 | Um | 370/352 |
| 2010/0046509 | A1 * | 2/2010 | Shi et al. | 370/352 |

OTHER PUBLICATIONS

G. Camarillo et al., "Mapping of Integrated Services Digital Network (ISDN) User Part (ISUP) Overlap Signaling to the Session Initiation Protocol (SIP)," RFC 3578; http://www.ietf.org/rfc/rfc3578.txt; Aug. 2003; 13 pages.
J. Rosenberg, "A Data Model for Presence," RFC 4479; http://www.ietf.org/rfc/rfc4479.txt; Jul. 2006; 36 pages.
J. Elwell et al., Interworking Between the Session Initiation Protocol (SIP) and QSIG, RFC 4497;http://www.ietf.org/rfc/rfc4497.txt; May 2006; 66 pages.

* cited by examiner

*Primary Examiner* — Thjuan K Addy (57) ABSTRACT

A method is provided in one example embodiment and includes communicating initial digits associated with an original request for a call and receiving a message indicating an incomplete address for the original request. The method also includes responding to the message by appending additional digits to the original request to generate a new request. The additional digits are buffered before receiving the message indicating the incomplete address associated with the original request. In other embodiments, the original request is a session initiation protocol (SIP) INVITE message that includes a uniform resource identifier (URI), which reflects an address for reaching a destination user. The initial digits can be partially matched against a dial plan in order to trigger the message associated with the original request. The additional digits are configured to satisfy the message and to connect the call. The message associated with the original request can be a session initiation protocol (SIP) 484 message.

20 Claims, 4 Drawing Sheets

SYSTEM AND METHOD FOR PROVIDING SIGNALING IN A NETWORK ENVIRONMENT

TECHNICAL FIELD

This disclosure relates in general to the field of communications and, more particularly, to providing signaling in a network environment.

BACKGROUND

The field of communications has become increasingly important in today's society. In particular, the ability to quickly and effectively connect individuals (through any suitable communications media) presents a significant obstacle for component manufacturers, system designers, and network operators. This obstacle is made even more difficult due to the plethora of diverse communication technologies that exist in the current marketplace. As new communication platforms become available to the consumer, new protocols should be developed in order to optimize these emerging technologies. Some issues have arisen in dialing scenarios in which end users should input a sufficient number of digits before being connected to their call.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment and includes communicating initial digits associated with an original request for a call and receiving a message indicating an incomplete address for the original request. The method also includes responding to the message by appending additional digits to the original request to generate a new request. The additional digits are buffered before receiving the message indicating the incomplete address associated with the original request. In other embodiments, the original request is a session initiation protocol (SIP) INVITE message that includes a uniform resource identifier (URI), which reflects an address for reaching a destination user. The initial digits can be partially matched against a dial plan in order to trigger the message associated with the original request. The additional digits are configured to satisfy the message and to connect the call. The message associated with the original request can be a session initiation protocol (SIP) 484 message. In still other embodiments, a selected additional digit is communicated as a dual-tone multi-frequency (DTMF) signal, where the additional digit of the DTMF signal is not required to form a URI associated with the original request.

Example Embodiments

Figure 1:
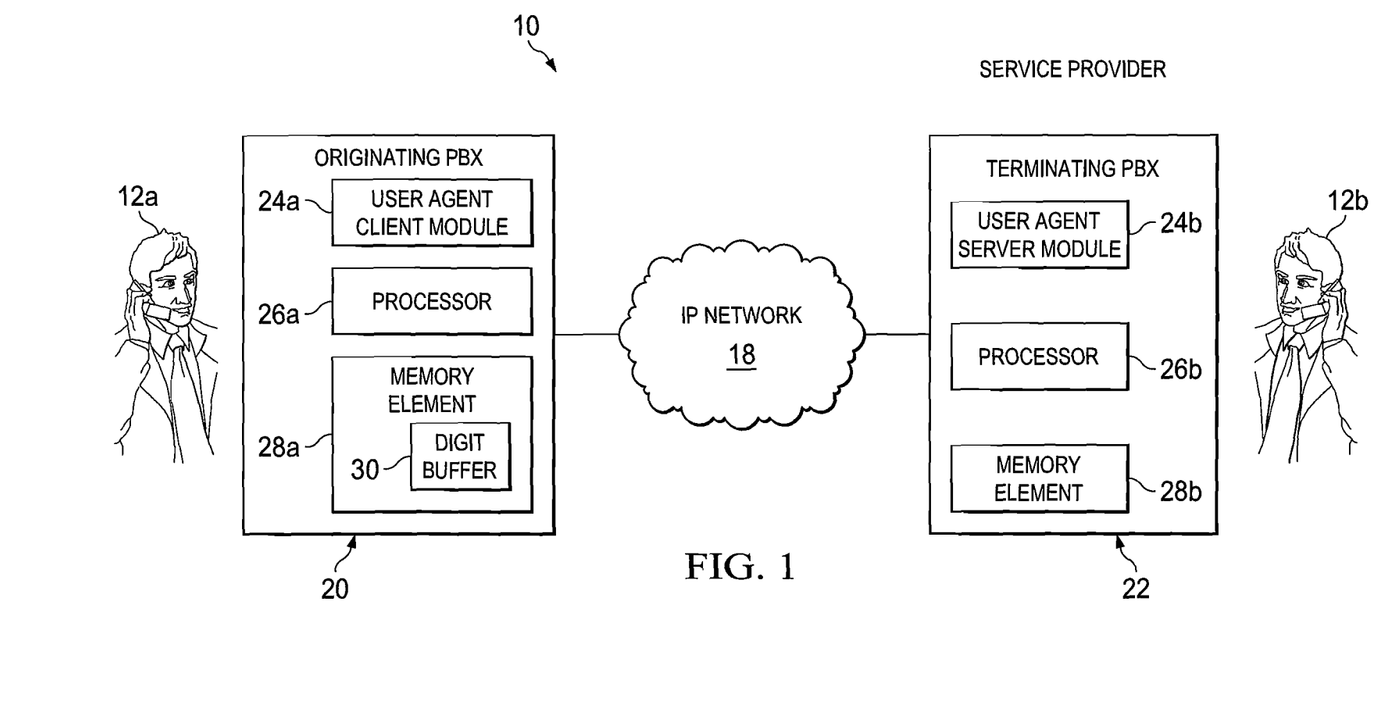
FIG. 1 is a simplified block diagram of a communication system for providing signaling in a network environment in accordance with one embodiment.

FIG. 1 is a simplified block diagram illustrating a communication system 10 for providing signaling in a network environment in accordance with one example embodiment. FIG. 1 includes multiple endpoints 12a-b associated with participants of a voice call. FIG. 1 also includes an Internet protocol (IP) network 18, an originating private branch exchange (PBX) 20, and a terminating PBX 22. In addition, FIG. 1 includes a user agent client module 24a, a processor 26a, and a memory element 28a, which includes a digit buffer 30. In a similar fashion, terminating PBX 22 includes a user agent server module 24b, a processor 26b, and a memory element 28b.

Note that before turning to the example flows and infrastructure of example embodiments of the present disclosure, a brief overview of the signaling architecture is provided. The components of the signaling architecture of FIG. 1 can use technologies in conjunction with specialized applications and hardware to create a solution that can efficiently connect calls in a session initiation protocol (SIP) environment. This signaling architecture can use SIP technology, IP technology, and QSIG communications to foster voice calls over the network. Note that Q signaling (abbreviated QSIG) is commonly a protocol for communications that can be based on the Q.931 standard. QSIG can be used for signaling between digital private branch exchanges. QSIG can also be employed in voice over IP networks, virtual private networks (VPNs), high-speed multi-application networks for corporations, educational institutions, and government agencies, etc.

There are certain parts of the world that use phone numbers of varying lengths, and this stands in contrast to the US system, where most phone numbers have a common length. In many instances, a basic number is used that serves as a preliminary logical connection to some network component (e.g., a PBX). Thus, when the user is dialing a desired number, he may continue dialing digits until he reaches the proper connection destination. The SIP platform is not necessarily accommodating in this regard. In one sense, all of the digits are accumulated before a SIP request for establishing a session is sent, where an open question remains concerning how many digits should be included before a call is properly connected.

There are certain dial plans that intuitively understand that if a certain digit string begins in a specific manner, the length of the dial string is known. For example, in many office scenarios involving internal communications amongst employees, after pressing the digit '9', the phone could have the intelligence to understand that a four-digit extension is forthcoming. In a similar vein, based on a particular configuration, the phone could understand that when the user pressed the digit '8', he is seeking an outside line and, therefore, more digits are expected. For example, typical US protocols indicate a switch to a local standard dial plan for the remaining digits. If a 1 were dialed, 10 more digits would be expected. If a digit greater than 1 were dialed, 6 more digits would be expected. This knowledge cannot be universally applied for a platform that provides interworking between QSIG and SIP. This is because equipment added by the customer can change the number of digits and, hence, the digit string can be any number of possible lengths. In essence, this digit length information is not known in advance, as the user begins dialing digits.

QSIG is an Integrated Services Digital Network (ISDN) based signaling protocol for signaling between PBXs in a private integrated services network (PISN). QSIG can make use of the connection-level Q.931 protocol. QSIG allows interoperability between communication platforms provided by disparate vendors. QSIG networks (e.g., in European countries) use overlap signaling to setup a call. SIP generally uses En-block signaling, but overlap dialing is incompatible with SIP. Corporate networks have evolved from circuit-switched technologies to voice over IP (VoIP) technologies using SIP, and these technologies coexist in many networks.

There are some inherent difficulties in coordinating dialing across different platforms. For example, to bind subsequent INVITE(s) to a previous INVITE, a gateway should check a call-ID and/or tags associated with the flow. One inconsistency in this interaction is that the call-ID and the tags can be changed by a back-to-back user agent (B2BUA). In addition, to enforce bindings, subsequent INVITE(s) should be routed to the same gateway that handled the initial INVITE. This means that the path of the subsequent INVITE should be the same as the initial one. Intermediate servers between the sender and a receiving gateway should be aware of a potential overlap in signaling.

In regards to a QSIG-SIP gateway, in-dialog information (INFO) can be used to send additionally dialed digits. However, the QSIG-SIP gateway can receive the extra digits without a suitable context. In essence, the gateway does not know whether the digits are additionally dialed digits to be, for example, combined with digits received in the original INVITE. Alternatively, instead of using the digits for routing the call toward the destination, the digits could represent Dual-Tone Multi-Frequency (DTMF) objects, which should be played out on a media path. It should also be noted that because INFO should be sent as part of an in-dialog operation, an early dialog should be adequately established. This requires a reliable provisional support on both the sending user agent and the terminating gateway. Along similar reasoning, there are offer/answer complications if an INVITE does not have the offer session description protocol (SDP), and the terminating gateway does not have the offer SDP to send a reliable provisional response.

One common solution to these dialing inadequacies is to use a series of timeouts. The system can understand that after a certain period, the dialing has ended and whatever digits have been entered should be sent to their next destination. This inefficient configuration can add an unnecessary delay to every call because certain users will quickly finish their dialing pattern (e.g., as can happen with speed dials) and prefer to be connected immediately. In other scenarios, if the user is not quick enough in his dialing, the system can cancel the call, where a prerecorded message is played to the end user because a sufficient number of digits have not been successfully entered during the allotted time. Another suggested alternative might be to simply send the message each time a digit is entered; however, this superfluous signaling is expensive and, therefore, does not solve this dialing issue.

Communication system 10 can offer a viable mechanism to properly support overlap signaling in SIP. In one example implementation, when a SIP-QSIG gateway receives an initial INVITE with incomplete dialed digits, it can match the received digits against a dial plan(s). Depending on the result of the match, the gateway can be configured to send an address incomplete response (e.g., a 484 address incomplete message) with an indication of the required number of digits to create a valid request uniform resource identifier (URI) based on the associated dial plan. A SIP URI can be the SIP addressing schema to call another person via SIP. Stated differently, a SIP URI is a user's SIP address. The SIP URI can resemble an e-mail address and is often written in the following format: SIP URI=sip:x@y:Port (where x=user name and y=host (domain or IP)).

Through a signaling mechanism, either via configuration or through some option tag in the initial request, a terminating gateway (e.g., a user agent server (UAS)) understands that the sender (e.g., user agent client) supports certain signaling. It should be noted that this activity does not affect UAS behavior in returning a suitable 484 response. If the gateway has allocated any resources on the SIP and/or QSIG leg, it can release resources after sending the response.

Note that there are other forms of a SIP URI. Certain example embodiments of the present disclosure can focus on SIP URIs that contain phone numbers. Specifically, the architecture can address the scenario in which the calling user does not know the SIP URI of the callee, or alternatively where the calling user is dealing with a device that accepts digit inputs. The device can make an intelligent decision for the URI by assembling dialed digits and incorporating them with some domain name information.

In operation, user agent client module 24a can buffer any additional digits dialed by the caller. When originating PBX 20 receives the 484 message, it responds by appending (e.g., to the previously dialed digits), enough of the buffered digits to satisfy the count identified in the 484 message. Thus, the new INVITE request includes the necessary information to connect this particular call. When appropriate, originating PBX 20 awaits the entry of a sufficient number of additional digits from end user 12a. In the event that the initially dialed digits potentially match multiple dial plans, the receiving gateway (e.g., terminating PBX 22) replies with the minimum number of digits required to form a valid request URI. If a subsequent dialing attempt provides the requested digits, but within a pattern requesting more digits, then terminating PBX 22 could similarly reply with a 484 message with a minimum number of digits for a valid request URI with that prefix.

Thus, a URI in the original request contains the initial digits. The called user can be located by matching the digits in the URI against a dial plan. In particular, a calling UAC can have a dial plan that provides the initial decision of when to form the digits into a URI and send an initial INVITE. The called UAS can have a different dial plan that indicates more digits are required. The difference in dial plans could be significant, as devices proximate to the called party are likely to have more accurate dial plans than dial plans held by the calling user. In a SIP embodiment, added digits could be added to the former digits to form a new URI for the new call. Received and buffered digits can be categorized according to which digits could form part of the address. Once the proper number of digits has been selected to establish the call, then subsequent to the call being established, remaining buffered digits can be played out in DTMF (or any other suitable protocol negotiated for transmitting such digits). In one instance, only those digits that were not required to form the URI for the call can be sent as DTMF. Note also that here are many variants of how the digits might be sent. For example, this could be accomplished via DTMF encoding over an audio media stream, as telephone-events encoding in the media stream, as Keypad Markup Language (KPML) signaling, or as INFO messages containing DTMF. There is a logical separation between digits that are part of the address and digits that are intended to be delivered after the session is established.

Consider another example in which a caller has a dial plan that accepts numbers in the form 44xxxxx. In this particular example, there is a QSIG-SIP gateway provisioned for 441111x, and which accepts 441111[0-8], 4411119xxx. When a user dials 4411119, then user agent client module 24a can send an INVITE to sip:4411119@qsig-gateway.com. When the INVITE arrives at the terminating side (e.g., terminating PBX 22), the terminating side can return an incomplete address message (e.g., a 484 message) with an indication for three more digits. Continuing along with this particular example, while that INVITE and its response were exchanged between user agent client module 24a and user agent server module 24b, the caller dialed the added digits "2345." Originating PBX 20 can buffer those digits for later use.

When the 484 message is received, user agent client module 24a is configured to utilize buffered digits (designated by the 484 message) and properly add them to the prior ones to make a new URI provided as: sip:4411119234@qsig-gateway.com. Thus, a new INVITE is sent with the requisite number of digits, where the remaining digit (i.e., 5) remains buffered. In this example, on the terminating side, user agent server module 24b accepts this new information and returns a ringing message (e.g., a 180 message) and then an OK message (e.g., a 200 message). When prompted to validly do so, user agent client module 24a could then send the remaining digit, 5, as a DTMF digit. Thus, the minimum number of additional digits necessary for the call can be received with the incomplete address indication. Typically, another attempt for establishing the call is not made until the indicated number of additional digits has been obtained: either from buffered digits, or through waiting for the digits to be dialed.

Several important advantages can be achieved by certain embodiments presented herein. For example, terminating PBX 22 is already provisioned with the full dial plan and, hence, does not consume resources on the QSIG leg of the call. Additionally, there is no dependency for a retried request on the original request with incomplete dialed digits. This could allow interoperability with B2BUAs, which can modify call identifiers. In addition, the mechanisms outlined herein eliminate the need to establish an early dialog such that in-dialog INFO requests with additional digits can be sent. Thus, there are no offer/answer dependencies, as typically happens if an initial INVITE is delayed media (e.g., where a reliable provisional mechanism is enabled). Before turning to additional details related to example operations associated with communication system 10, a brief overview of the infrastructure of FIG. 1 is provided.

Endpoints 12a-b can be associated with clients or customers wishing to participate in a voice call in communication system 10. The term 'endpoint' may be inclusive of devices used to initiate a communication, such as a switch, a console, a proprietary endpoint, a telephone, an IP phone, an iPhone, a cellular telephone, a bridge, a computer, a personal digital assistant (PDA), a laptop or an electronic notebook, or any other device, component, element, or object capable of initiating voice, audio, or data exchanges within communication system 10.

Endpoints 12a-b may also be inclusive of a suitable interface to the human user, such as a microphone, a display, or a keyboard or other terminal equipment. Endpoints 12a-b may also include any device that seeks to initiate a communication on behalf of another entity or element, such as a program, a database, or any other component, device, element, or object capable of initiating a voice, a video, a media, or a data exchange within communication system 10. Data, as used herein in this document, refers to any type of video, numeric, voice, media, or script data, or any type of source or object code, or any other suitable information in any appropriate format that may be communicated from one point to another.

IP network 18 represents a series of points or nodes of interconnected communication paths for receiving and transmitting packets of information that propagate through communication system 10. IP network 18 offers a communicative interface between servers (and/or endpoints) and may be any local area network (LAN), a wireless LAN (WLAN), a metropolitan area network (MAN), a virtual LAN (VLAN), a virtual private network (VPN), a wide area network (WAN), or any other appropriate architecture or system that facilitates communications in a network environment. IP network 18 can implement a transmission control protocol (TCP)/Internet Protocol (IP) communication language protocol in a particular embodiment of the present disclosure; however, IP network 18 may alternatively implement any other suitable communication protocol for transmitting and receiving data packets within communication system 10. Note also that IP network 18 can accommodate any number of ancillary activities, which can accompany a call.

A SIP user agent (UA) is a logical network endpoint that can be used to create or receive SIP messages and, thereby, manage a SIP session. A SIP user agent can perform the role of a user agent client (UAC), which sends SIP requests, and the user agent server (UAS), which can receive the requests and can return a suitable SIP response. These roles of user agent client and agent server typically last for the duration of a SIP transaction. A SIP phone can be a hardware-based or software-based SIP user agent that provides call functions such as dial, answer, reject, hold/unhold, call transfer, etc.

Each resource of a SIP network, such as a user agent or a voicemail box, can be identified by a URI, based on the general standard syntax also used in Web services and e-mail. A typical SIP URI can be of the form: sip:username:password@host:port. In SIP, as in HTTP, the user agent may identify itself using a message header field 'User-Agent', containing a text description of the software/hardware/product involved. The user-agent field can be sent in request messages, which means that the receiving SIP server can see this information. SIP network elements can store this information, and it can be useful in diagnosing SIP compatibility problems. SIP also defines server network elements.

Note that originating PBX 20 may be replaced by any suitable element configured to initiate a call flow using SIP. This can include telephones, PBXs, gateways, call managing elements, any type of SIP user agent, or any other suitable end-user device, console, platform, or object configured to initiate a call. Originating PBX 20 and terminating PBX 22 are network elements that facilitate calls between endpoints and a given network (e.g., for networks such as those illustrated in FIG. 1). As used herein in this Specification, the term 'call' is meant to encompass any packet exchange (e.g., data, voice, video, media, etc.) that occurs in a network environment. As used herein in this Specification, the term 'network element' is meant to encompass network appliances, telephones, gateways, call managing elements, any type of SIP user agent, servers, routers, switches, bridges, loadbalancers, PBXs, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information to facilitate the dialing operations defined herein.

Originating PBX 20 and terminating PBX 22 may include user agent client module 24a and user agent server module 24b (respectively) in order to provide efficient dialing operations, as detailed herein. Moreover, these modules may include any suitable hardware, software, components, interfaces, or objects that facilitate the operations thereof. This may be inclusive of appropriate algorithms and communication protocols that allow for the effective exchange of data or information. In other embodiments, this dialing feature may be provided externally to originating PBX 20 and terminating PBX 22, or included in some other network element to achieve this intended functionality. Alternatively, network elements (e.g., originating PBX 20 and terminating PBX 22) can include reciprocating software that can coordinate in order to achieve the intelligent dialing operations, as outlined herein. In still other embodiments, one or both of these devices may include any suitable algorithms, hardware, software, components, modules, interfaces, or objects that facilitate the operations thereof.

Consider another example that is illustrative of some of the teachings of the present disclosure. End user 12a can be seeking to contact end user 12b for a phone call. In one instance involving SIP, the originating digits can be in the form of an INVITE message. Originating PBX 20 can receive the digits (i.e., the INVITE) being initiated by end user 12a, where those digits can propagate through IP network 18 and be received at terminating PBX 22. This terminating device may quickly evaluate the digits and recognize that a sufficient number of digits have not been received. Terminating PBX 22 understands the dialing forms that are to be expected for the incoming digits. In this particular example, terminating PBX 22 has identified that at least three more digits are needed before this particular call can be properly connected to end user 12b. In essence, end user 12a has not entered the proper number of digits.

An interim response message can be generated at this juncture to inform end user 12a that he needs to enter more digits. Note that originating PBX 20 can be configured for certain signaling (i.e., it creates and sends an INVITE request with the dialed digits). More specifically, the dial plan that is followed indicates whether the number of digits entered is enough. Alternatively, an INVITE can be sent as soon as there is a slight pause in dialing.

Originating PBX 20 has the intelligence to perform several tasks. First, originating PBX 20 continues to monitor this call for any type of response from its peer, which is terminating PBX 22. Thus, originating PBX 20 can properly receive this particular interim response message. Second, originating PBX 20 can continue to receive information from end user 12a and this could be in the form of additional digits. In this particular instance, end user 12a delayed slightly before entering additional digits associated with this particular call. The entering of these additional digits occurred while the initial INVITE was being processed by terminating PBX 22. Instead of discarding these additional digits, even though the original INVITE message has been sent, originating PBX 20 can buffer these digits (e.g., within digit buffer 30) such that they can be used at a later time.

After receiving the interim response, originating PBX 20 can evaluate its internal memory storage in order to identify whether it has received additional digits from end user 12a. In the event it has not received any additional digits, it can communicate a message back to end user 12a, or simply wait until additional digits have been entered. In the case that originating PBX 20 discovers additional digits in its buffer, it can add these digits to the original INVITE message and resend the message over the network. In other instances, originating PBX 20 can simply generate a new INVITE message and cause that message to be propagated over the network, where the original INVITE message may be discarded or dropped. In still other embodiments, originating PBX 20 can simply send along the additional digits found in the buffer.

Figure 2A:
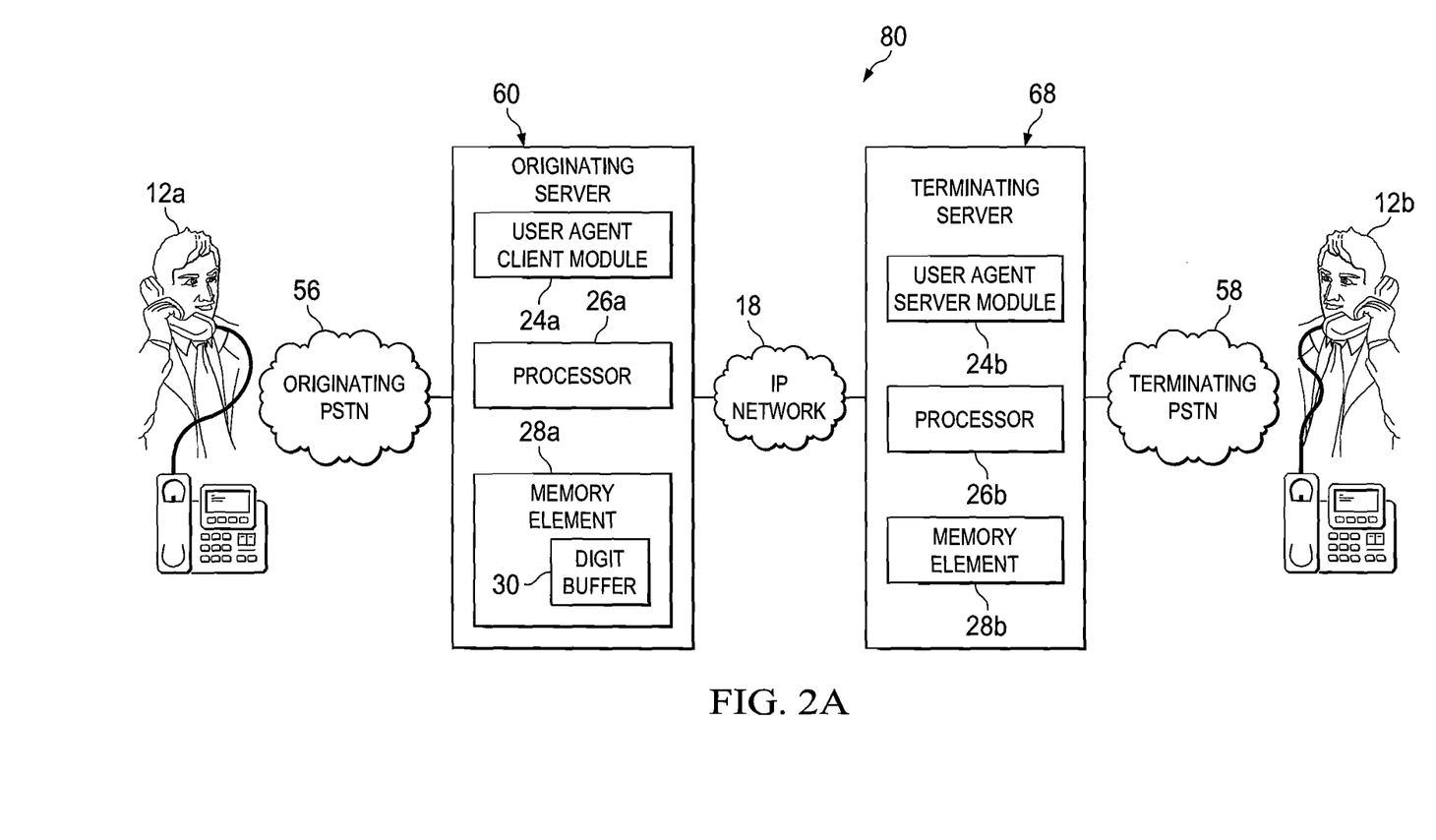
FIG. 2A is a simplified block diagram of another embodiment of a communication system for providing signaling in a network environment.

Turning to FIG. 2A, FIG. 2A is a simplified block diagram of a communication system 80 that represents another embodiment of the present disclosure. In this instance, end user 12a is operating an IP phone that has a logical connection to an originating public switched telephone network (PSTN) 56, which is coupled to an originating server 60. Also depicted in this FIG. 2A is a terminating server 68, which has a logical connection to a terminating PSTN 58 that services end user 12b operating an IP phone. This particular example presumes that there are gateways and/or servers operating in conjunction with this specific call flow, where IP network 18 allows servers to communicate with one another. More specifically, in cases where someone is entering digits one by one, the digits are being transmitted to some device. The recipient of those digits is typically the UAC, which assembles the digits into a URI for purposes of initiating an INVITE. Note that this could involve a SIP phone that assembles digits typed on its keypad. Alternatively, this could involve a SIP gateway assembling digits received via some non-SIP protocol.

Note that the internal structure of originating server 60 and terminating server 68 is similar to that discussed above with respect to FIG. 1 (i.e., inclusive of processors, memory elements, a digit buffer, end user agent modules). In particular, provided in these components is user agent client module 24a and user agent server module 24b (respectively), which can perform operations similar to those described above. Note also that on the terminating side of FIG. 1, various signaling can occur. The signaling can be part of a translation involving several different protocols. This additional signaling can be based on which particular component of the network would receive the INVITE message. In some instances, the INVITE can be received by a gateway, by a call managing element, by a server, etc. Thus, there will be some coordination involved in assuring that the proper number of digits has been entered such that a call can be properly connected.

Figure 2B:
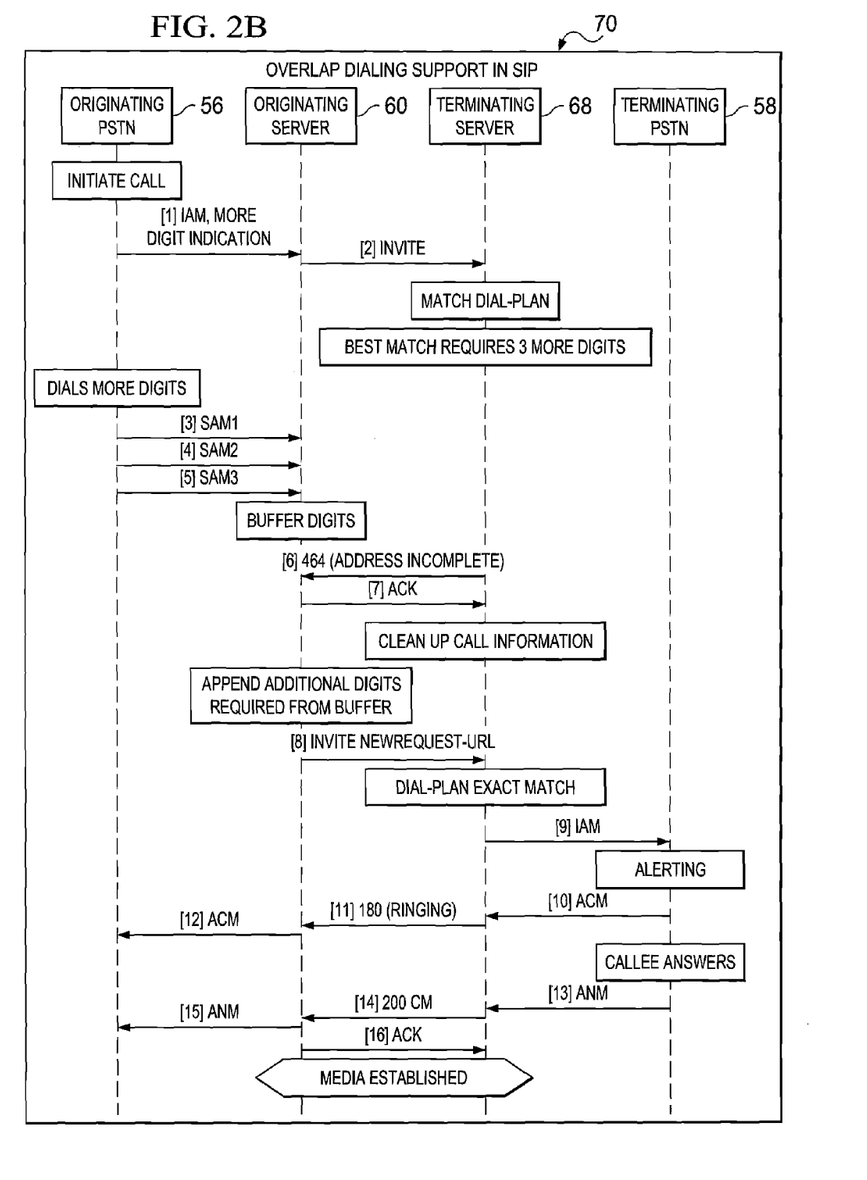
FIG. 2B is a simplified flowchart illustrating a series of example steps associated with the communication system.

FIG. 2B is a simplified flow diagram 70 associated with the architecture of FIG. 2A. The call can begin at step one, where a "more digit indication" is sent via a suitable message. In this particular example, originating server 60 receives an IAM (initial address message) that contains a portion of the called number. [Note that in many cases, an originating switch sends a "more digit indication" with the IAM message.] The rest of the digits dialed arrive later in one or more SAMs (subsequent address messages), as detailed below. In essence, originating server 60 is about to become stuck because of an insufficient number of digits being dialed by end user 12a. At step two, the INVITE is sent from originating server 60 to terminating server 68. A dial plan is matched by terminating server 68, which recognizes that the shortest match would require three more digits.

At steps three through five, end user 12a dials more digits that are sent to originating server 60, which buffers the digits for later use. Terminating server 68 sends an address incomplete message (e.g., a 484 message) that is delivered to originating server 60 at step six. An acknowledgment (ACK) is sent back to terminating server 68 at step seven. Terminating server 68 may also take the initiative to cleanup call information at this juncture. At step eight, originating server 60 can append additional digits required (and which have been stored in a buffer) in order to deliver a new INVITE having a new request URI. These digits satisfy an exact match for the dial plan, where a subsequent IAM is sent to terminating PSTN 58 at step nine.

An address complete message (ACM) is sent at step ten, where ringing commences at step eleven, and the ACM is delivered to originating PSTN 56 at step twelve. More specifically, the UAS and the terminating PSTN network can agree about the number of digits required. Thus, the technique outlined herein can operate better if the terminating UAS has accurate information about the called numbers.

At step thirteen, the callee answers the call, where an answer message (ANM) is delivered to terminating server 68. An 'OK' acknowledgment message is delivered to originating server 60 at step fourteen. Additionally, an ANM message is delivered at step fifteen to originating PSTN 56. Finally, at step sixteen, a simple acknowledgment (ACK) message can be exchanged between originating server 60 and terminating server 68, where a voice call is established between these two elements.

Figure 3:
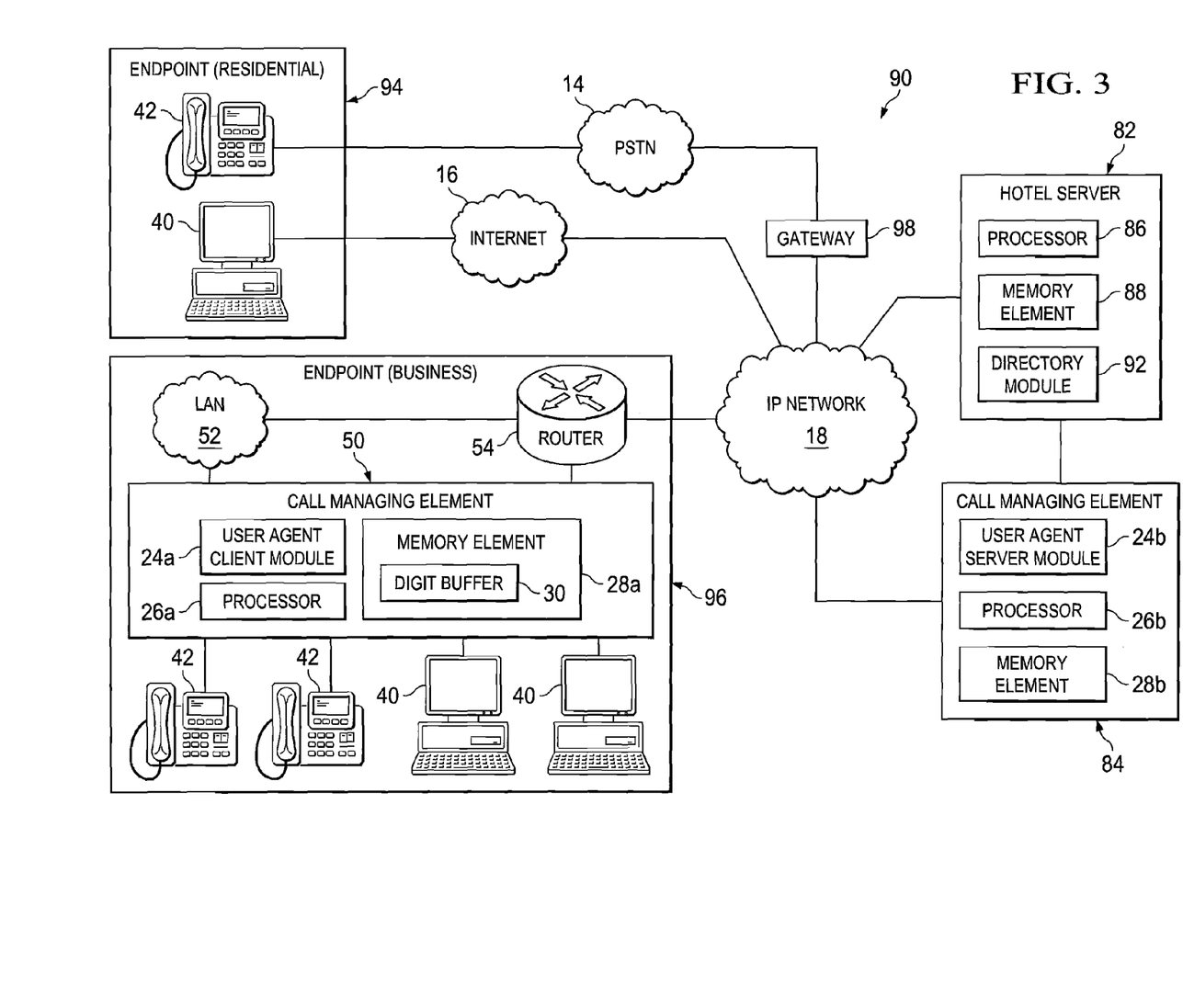
FIG. 3 is a simplified block diagram of another embodiment of a communication system for providing signaling in a network environment.

FIG. 3 is a simplified block diagram illustrating another embodiment of a communication system 90 associated with the present disclosure. In certain examples, the architecture discussed herein can be provided as its own internal system (e.g., in a hotel environment in which some operator/assistance tool can connect calls within the infrastructure). This type of environment is illustrated by FIG. 3, which can include a public switched telephone network (PSTN) 14 and an Internet 16.

An endpoint 94 represents a residential node, which in this instance includes a computer 40 and a telephone 42. Telephone 42 may be an IP telephone or a standard telephone that is operable to participate in a telephone voice call (e.g., using dial-in information, a meeting ID, etc.). In certain examples, endpoint 94 can interface with computer 40 such that one or more capabilities of SIP are enabled through telephone 42. Endpoint 96 is associated with a business entity that can include a connection to a local area network (LAN) 52, a router 54, several computers 40, and several telephones 42. In this instance, endpoint 96 also includes a coupling to a call managing element 50, which is configured to coordinate calls for this particular node. Call managing element 50 can also interact with computers 40 and telephones 42 to enhance, or otherwise manage, voice calls. These calls may involve network communications and/or media applications in which participants interact. Call managing element 50 may suitably interface with a peer call managing element 84, which may be provisioned at the hotel premise in one example implementation. In this particular instance, call managing element 50 and 84 may include an internal structure that is similar to that of originating PBX 20 and terminating PBX 22 respectively (e.g., having a processor, a memory element, a user agent module, etc.), as is depicted.

Also provided in FIG. 3 is a hotel server 82, which includes a processor 86, a memory element 88, and a directory module 92. Hotel server 82 has the intelligence to know whether the numbers being dialed represent a complete number. For example, hotel server 82 and/or call manager element 84 can recognize that there are three missing digits associated within an incoming call. This could involve interaction with a database, or any other suitable memory element. In essence, these devices know the dial plans for their associated users and, therefore, can readily identify a deficiency in a digit string length. A gateway 98 is also provided between PSTN 14 and IP network 18. Gateway 98 could include a UAC element that can buffer the digits, as outlined herein. Note also that IP phone 42 can connect directly to IP network 18 and could include a UAC element to achieve the operations outlined herein.

In this particular example, the caller is using IP telephone 42 (in Boston, Mass.) to contact a friend staying in a hotel in Germany. In this instance, the end user initially inputs a number of digits, but this digit length is incomplete. The end user realizes this deficiency; however, the original message has already been sent. In response to his mistake, the end user enters additional digits, which can be suitably stored in some type of buffer storage element. Concurrently, the system has realized the deficiency in digit length and responded accordingly by communicating back an address incomplete message to the originating side of the network. A call managing element can use the additional digits to append the missing information to the INVITE, which is sent back over to the terminating side for this particular call. From this point, a call may begin ringing and the participants (upon the call being answered) would be connected.

As identified previously, a network element can include software to achieve the intelligent dialing operations, as outlined herein in this document. Additionally, in certain example implementations, the dialing functions outlined herein may be implemented by logic encoded in one or more tangible media (e.g., embedded logic provided in an application specific integrated circuit (ASIC), digital signal processor (DSP) instructions, software (potentially inclusive of object code and source code) to be executed by a processor, or other similar machine, etc.). In some of these instances, a memory element (as shown in FIGS. 1, 2A, 3) can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, the processor (as shown in FIGS. 1, 2A, 3) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable ROM (EEPROM)) or an ASIC that includes digital logic, software, code, electronic instructions, or any suitable combination thereof.

Any of these network elements (e.g., the servers, the PBXs, the user agents, the gateways, etc.) can include memory elements for storing information to be used in achieving the dialing operations as outlined herein. Additionally, each of these devices may include a processor that can execute software or an algorithm to perform the intelligent dialing activities as discussed in this Specification. These devices may further keep information in any suitable memory element (random access memory (RAM), ROM, EPROM, EEPROM, ASIC, etc.), software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Note that with the examples provided herein, interaction may be described in terms of two, three, four, or more network elements. However, this has been done for purposes of clarity and example only. In certain cases, it may be easier to describe one or more of the functionalities of a given set of flows by only referencing a limited number of components or network elements. It should be appreciated that communication systems 10, 80, 90 of FIGS. 1, 2A, 3 (and its teachings) are readily scalable. Communication systems 10, 80, 90 can accommodate a large number of components, as well as more complicated or sophisticated arrangements and configurations. Accordingly, the examples provided should not limit the scope or inhibit the broad teachings of communication systems 10, 80, 90 as potentially applied to a myriad of other architectures. Along similar reasoning, a number of different protocols may be accommodated by communication systems 10, 80, 90. For example, in certain embodiments, the mechanisms outlined herein can be used in a Keypad Markup Language (KPML) context. KPML can provide instructions to SIP user agents for the reporting of user key presses. To use KPML in conjunction with certain architectures outlined herein, a user agent server associated with the incomplete number can make a KPML subscription back to the user agent client. Before the subscription is established, the caller may have dialed additional digits. As KPML is defined, it is not permitted to return any digits entered prior to receipt of the subscription request. Hence, those dialed digits will not be reported to the user agent server and this could prevent correct call establishment in this case. The SIP response from a network element (e.g., a server) to the client can be used to carry an indication of the minimum number of additional digits required for a dial plan match on the server. The client could then append additional digits to the previously dialed digits and, subsequently, send a new request.

It is also important to note that the steps described with reference to the preceding FIGURES illustrate only some of the possible scenarios that may be executed by, or within, communication systems 10, 80, 90. Some of these steps may be deleted or removed where appropriate, or these steps may be modified or changed considerably without departing from the scope of the discussed concepts. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication systems 10, 80, 90 in that any suitable arrangements, chronologies, configurations, and timing mechanisms may be provided without departing from the teachings of the discussed concepts.

What is claimed is:

1. A method, comprising:
communicating initial digits associated with an original request for a call;
receiving a message indicating an incomplete address for the original request; and
responding to the message by appending additional digits to the original request to generate a new request, wherein the additional digits are buffered before receiving the message indicating the incomplete address associated with the original request.

2. The method of claim 1, wherein the original request is a session initiation protocol (SIP) INVITE message that includes a uniform resource identifier (URI), which reflects an address for reaching a destination user associated with the call.

3. The method of claim 1, wherein the initial digits are partially matched against a dial plan in order to trigger the message indicating the incomplete address associated with the original request.

4. The method of claim 1, wherein the additional digits are configured to satisfy the message and to connect the call.

5. The method of claim 1, wherein the message indicating the incomplete address associated with the original request is a session initiation protocol (SIP) 484 message.

6. The method of claim 1, further comprising:
communicating a selected additional digit as a dual-tone multi-frequency (DTMF) signal, wherein the additional digit of the DTMF signal is not required to form a URI associated with the original request.

7. The method of claim 1, wherein the message includes a minimum number of additional digits for completing the incomplete address.

8. Logic encoded in one or more tangible, non-transitory media that includes code for execution and when executed by a processor operable to perform operations comprising:
communicating initial digits associated with an original request for a call;
receiving a message indicating an incomplete address for the original request; and
responding to the message by appending additional digits to the original request to generate a new request, wherein the additional digits are buffered before receiving the message indicating the incomplete address associated with the original request.

9. The logic of claim 8, wherein the original request is a session initiation protocol (SIP) INVITE message that includes a uniform resource identifier (URI), which reflects an address for reaching a destination user associated with the call.

10. The logic of claim 8, wherein the initial digits are partially matched against a dial plan in order to trigger the message indicating the incomplete address associated with the original request.

11. The logic of claim 8, wherein the additional digits are configured to satisfy the message and to connect the call.

12. The logic of claim 8, wherein the message indicating the incomplete address associated with the original request is a session initiation protocol (SIP) 484 message.

13. The logic of claim 8 being further operable to perform operations comprising:
communicating a selected additional digit as a dual-tone multi-frequency (DTMF) signal, wherein the additional digit of the DTMF signal is not required to form a URI associated with the original request.

14. The logic of claim 8, wherein the message includes a minimum number of additional digits for completing the incomplete address.

15. An apparatus, comprising:
a memory element configured to store data;
a processor operable to execute instructions associated with the data; and
a user agent module configured to interface with the memory element and the processor, the user agent module being configured to:
communicate initial digits associated with an original request for a call;
receive a message indicating an incomplete address for the original request; and
respond to the message by appending additional digits to the original request to generate a new request, wherein the additional digits are buffered before receiving the message indicating the incomplete address associated with the original request.

16. The apparatus of claim 15, wherein the original request is a session initiation protocol (SIP) INVITE message that includes a uniform resource identifier (URI), which reflects an address for reaching a destination user associated with the call.

17. The apparatus of claim 15, wherein the initial digits are partially matched against a dial plan in order to trigger the message indicating the incomplete address associated with the original request.

18. The apparatus of claim 15, wherein the additional digits are configured to satisfy the message and to connect the call.

19. The apparatus of claim 15, wherein the user agent module is further configured to:
communicate a selected additional digit as a dual-tone multi-frequency (DTMF) signal, wherein the additional digit of the DTMF signal is not required to form a URI associated with the original request.

20. The apparatus of claim 15, further comprising:
a digit buffer configured to store the additional digits used in generating the new request.

* * * * *